United States Patent [19]

Smith

[11] 4,143,246

[45] Mar. 6, 1979

[54] TIME DIVISION LINE INTERFACE CIRCUIT

[75] Inventor: Nicholas K. Smith, Naperville, Ill.

[73] Assignee: Bell Telephone Laboratories, Incorporated, Murray Hill, N.J.

[21] Appl. No.: 830,447

[22] Filed: Sep. 6, 1977

[51] Int. Cl.² ............................................. H04J 3/06
[52] U.S. Cl. ............................ 179/15 BS; 179/15 A
[58] Field of Search ............ 179/15 A, 15 BS, 15 BA, 179/15 AT

[56] References Cited

U.S. PATENT DOCUMENTS

| | | | |
|---|---|---|---|
| 3,531,777 | 9/1970 | West | 179/15 BS X |
| 3,676,599 | 7/1972 | Heetman | 179/15 BS |
| 3,940,558 | 2/1976 | Gabbard et al. | 179/15 BS X |
| 3,987,250 | 10/1976 | Barbier et al. | 179/15 BD |
| 4,023,145 | 5/1977 | Duerdoth et al. | 179/15 A X |

*Primary Examiner*—Thomas W. Brown
*Attorney, Agent, or Firm*—Peter Visserman

[57] ABSTRACT

An interface circuit adapted for use with a digital time division transmission system is disclosed, including a microprocessor operating in synchronism with data received over the transmission line and having a sequentially executed program, structured to service incoming and outgoing PCM lines on a periodic basis in synchronism with the bit rate of the incoming PCM bitstream.

10 Claims, 9 Drawing Figures

| FRAME NO. | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|
| $F_t$ BIT | 0 |   | 1 | 0 | 0 |   | 1 |   | 0 | 1 | 1 |   | 0 | 1 | 1 |   | 0 |   | 1 |   |
| $F_s$ BIT |   | 1 |   | 0 |   | 0 |   | 0 |   |   |   | 1 |   |   |   | 0 |   | 0 |   | 0 |

FIG. 6B

| FRAME NO. | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|
| COMBINED $F_t$ & $F_s$ | 0 | 1 | 1 | 0 | 0 | 0 | 1 | 0 | 0 | 1 | 1 | 1 | 0 | 1 | 1 | 0 | 0 | 0 | 1 | 0 |

TIME DIVISION LINE INTERFACE CIRCUIT

BACKGROUND OF THE INVENTION

This invention relates to a time division transmission system and, more particularly, to circuitry for providing an interface between time division multiplex lines and a communication switching system.

Traditionally, time division multiplex lines have been connected to a telephone switching office by means of an interface circuit which is commonly known as a D-bank. The D-bank will generally comprise time shared common circuitry and a number of channel units each of which is connected to a trunk interface circuit, referred to as a trunk circuit. The trunk circuit is interconnected to the switching network, and all control of communication over the multiplex transmission facilities is accomplished by control of the trunk circuit from the switching system controller. Such an interconnecting arrangement with multiple interface connections results in duplication of hardware, limits the access of the central processor to the transmission interface for signaling and maintenance purposes, and in many instances results in time consuming tasks by the central processor which place a significant real-time burden on the processor.

SUMMARY OF THE INVENTION

It is a primary object of the invention to provide an autonomous direct interface circuit between multiplex digital transmission facilities and a telephone switching system having a central controller.

It is a further object of the invention to provide such an interface circuit having a processor operating in synchronism with data received on a digital transmission system and wherein the functions of the interface circuit are executed sequentially without timed interrupts or other sophisticated interrupt arrangements.

In accordance with this invention, an interface circuit is provided which combines the several functions traditionally performed in several interface circuits and which provides access to the transmission system from the system's central controller. The interface circuitry of this invention includes multiplex transmission line receiver and driver circuits, circuits for deriving clock pulses in synchronism with the data bit rate of the incoming transmission line, a decoder circuit, an encoder circuit, and a plurality of individual analog circuits which interface directly with the switching network. Additionally, a processor is provided which performs such functions as monitoring information received from the transmission line (e.g., framing information), extracting signaling information from incoming lines, inserting signaling information on outgoing transmission lines, fault monitoring, and transmission tests. The processor further monitors and controls the operational states of the analog interface circuits which connect the transmission facilities to the switching network. Certain of these functions are synchronous functions while others are asynchronous. In one illustrative embodiment of the invention, the interface circuit processor is a programmable microprocessor. Commonly, where synchronous and asynchronous functions must be performed by a processor, means are provided for interrupting the processor after a specified period of time has elapsed. Advantageously, in accordance with this invention, the processor program execution circuitry operates under control of a clock which is synchronized to the incoming data bitstream which allows for execution of program instructions in synchronism with the bitstream. This synchronism makes it possible to define periods between occurrences in the data stream in terms of instruction execution cycles. Consequently, the sequential execution program of the processor may be structured in such a manner that timed functions (e.g., monitoring framing signals, etc.) are performed each time after completion of a predetermined number of program instruction execution cycles. Advantageously, no counters are required to measure elapsed time or to count numbers of cycles executed since the program is structured such that instructions for performing the synchronous functions will be executed in sequence each time after the execution of a certain number of instructions.

It is a particularly advantageous feature of this invention that an autonomously operating processor of relatively simple design will perform both synchronous and asynchronous functions for a time division multiplex communication line interface.

It is a further feature of this invention that access is provided to both the receive and transmit data streams for the purpose of inserting and monitoring data, by means of a program controlled processor operating in synchronism with the bit rate of the incoming data stream.

The above and other objects and features of this invention are illustrated in the following description in which reference is made to the accompanying drawing.

DETAILED DESCRIPTION

Figure 1:
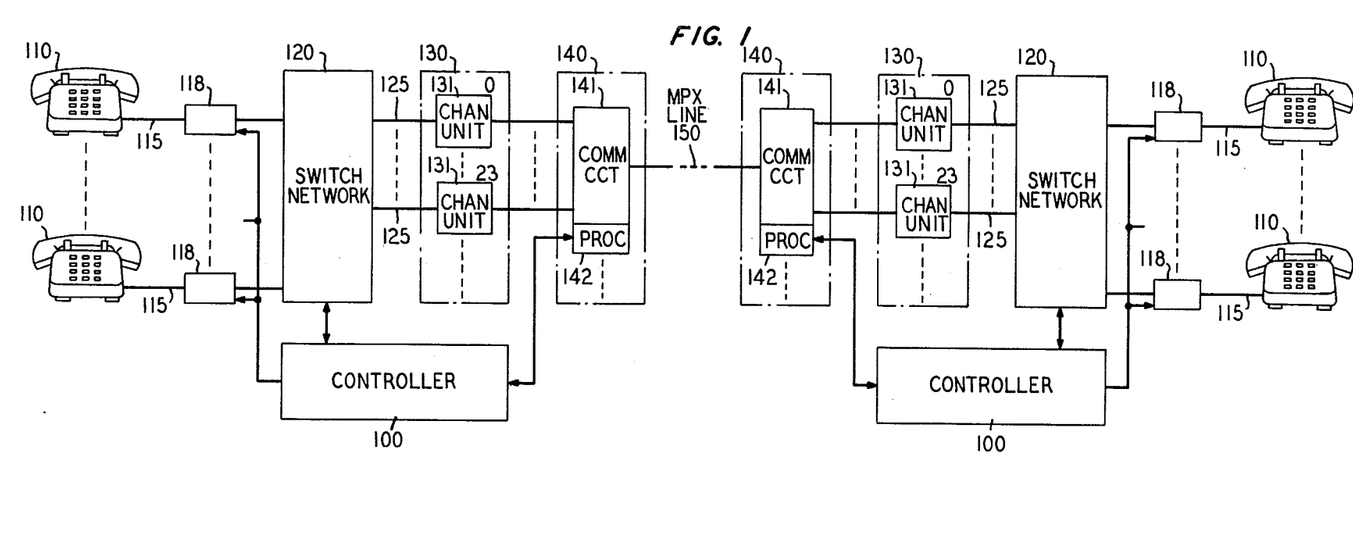
FIG. 1 is a block diagram representation of two interconnected telephone switching systems showing interface circuits according to this invention between the transmission facilities and the switching network.

In the illustrative telephone communication system depicted generally in FIG. 1, a plurality of telephone subscriber sets 110 are connected to switching networks 120 by means of subscriber lines 115 and conventional line circuits 118. The switching networks 120 are interconnected by means of a multiplex line 150 having interface circuits comprising a common circuits frame 140 and a channel unit frame 130, at each end. A plurality of simplex lines 125 are connected to corresponding channel units 131 in the channel unit frame 130. Each group of channel units 131 is connected to a multiplex/demultiplex circuit which is part of the common circuits 141 in the common circuits frame 140. The controller 100 monitors the states of the subscriber lines 115 at the line circuits 118, and controls the operational states of the line circuits 118 and the switching network 120. In accordance with this invention, the channel units 131 and transmission on the multiplex line 150 are monitored and controlled by means of an autonomous processor 142 associated with the common circuits 141.

Figure 2:
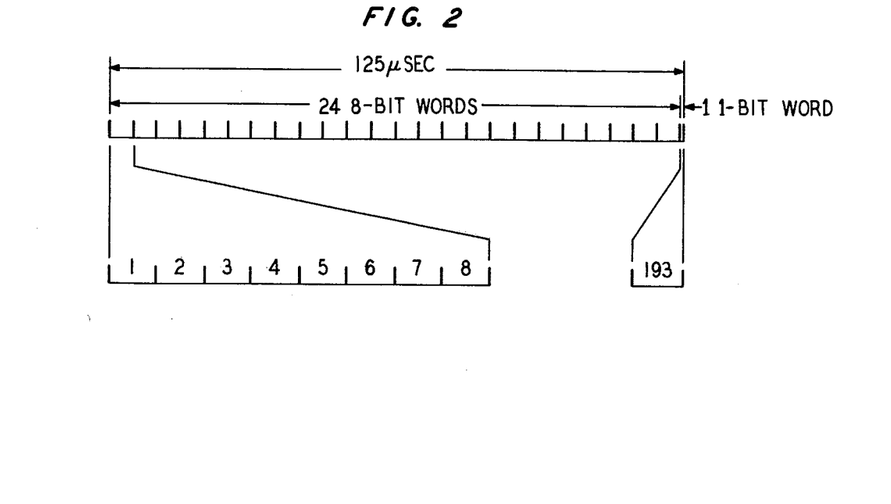
FIG. 2 is a diagramatic representation of a known PCM data format.

For the purposes of this disclosure, it is assumed that the multiplex line 150 is a telephone communication line for transmitting PCM signals representing speech. Furthermore, it will be assumed that the well-known D3 PCM format will be used. (See, for example, the article "The D3 Channel Bank" by W. B. Gaunt et al., Bell Laboratories Record, August, 1972, pages 229 through 233.) This format is represented in the diagram of FIG. 2 of the drawing. In accordance with this format, one frame has the duration of 125 microseconds and consists of 193 bits, i.e., bit rate of 1.544 megabits per second. Each frame comprises twenty-four 8-bit words, representing 24 communication channels, and a framing bit. The least significant bit of each channel (i.e., the eighth bit) is dedicated to signaling in one frame out of every six in which the channel appears. Incoming information received over the multiplex line 150 in the D3 format is demultiplexed and signals representing encoded speech samples are distributed to 24 channel units 131 by means of the common circuits 141, while the framing and signaling information is extracted in the common circuits 141. Outgoing information to be transmitted on the multiplex line 150 will comprise speech samples originating from the channel units 131 and signaling and framing information is inserted by the common circuits 141.

Figure 3:
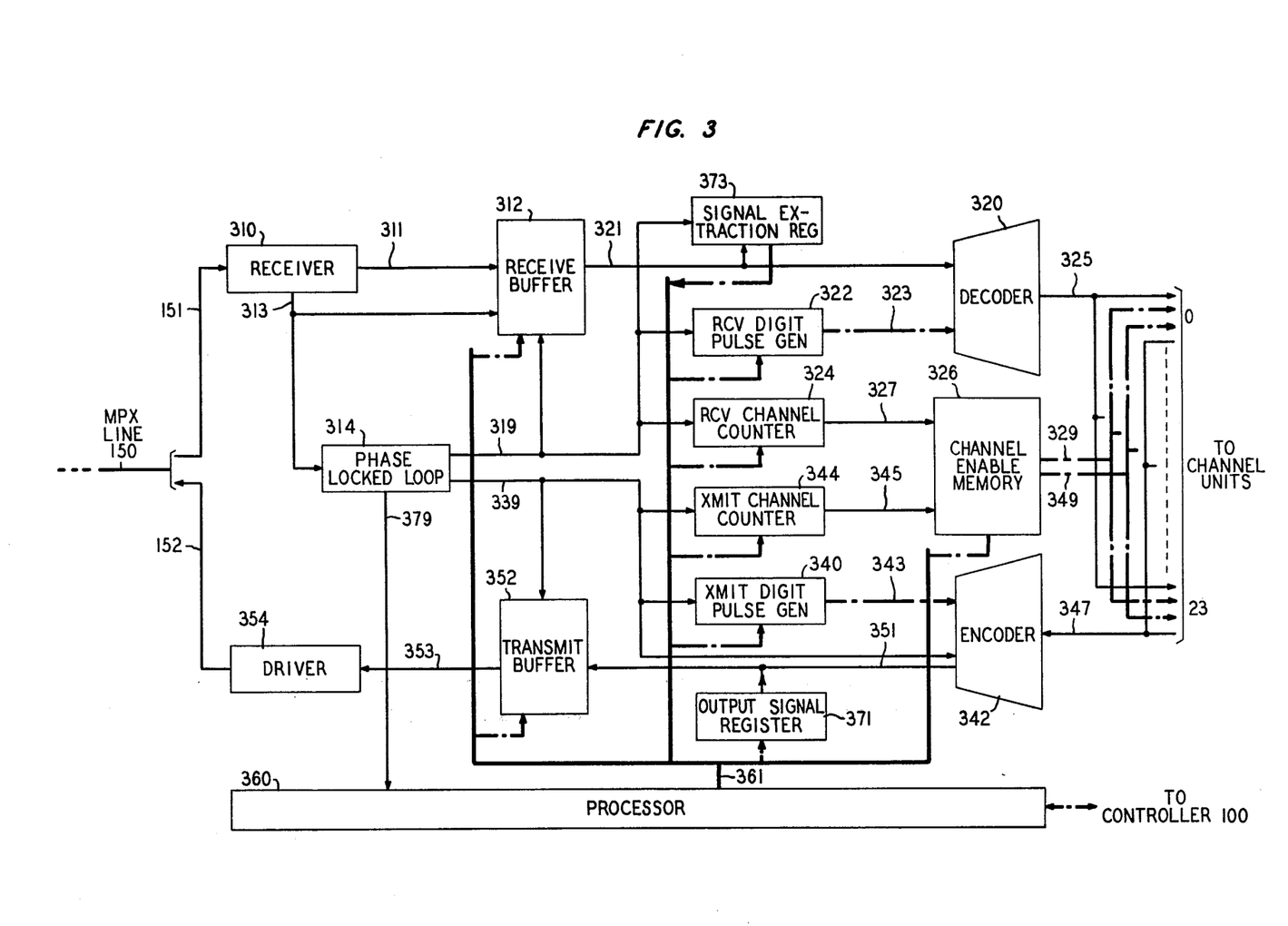
FIG. 3 is a more detailed representation of common circuits which interface between multiplex transmission line and demultiplexed channel unit facilities arranged in accordance with the invention.

The common circuits 141 are shown in greater detail in FIG. 3. The multiplex line 150 is assumed to comprise at least a receive portion and a transmit portion in order that two-way communication may be established. The receive portion, which will be referred to as the incoming PCM line 151, is connected to a conventional receiver circuit 310, which is similar to circuitry described in the article entitled "The T1 Carrier System," Bell System Technical Journal, Vol. 44, September, 1965, in pages 1405 through 1451. Customarily, PCM signals will be transmitted in the form of a three-level signal containing positive pulses, zeros, and negative pulses. The receiver 310 will serve to convert the three-level signal into a series of binary pulses in a known manner. The binary pulses will be transmitted from the receiver circuit 310, via conductor 311 to a receiver buffer 312, which acts as a jitter reducing circuit and which may be a commercially available First-In/First-Out buffer memory. As in other T1 systems, the receiver circuit 310 will generate a timing signal derived from the incoming bitstream. This timing signal will appear on the conductor 313 and will be used to write the data appearing on conductor 311 into the receive buffer 312.

The timing signal generated in the receiver circuit 310 and appearing on the conductor 313 will also be applied to a phase locked loop circuit 314. This circuit is shown in greater detail in FIG. 4. Such a phase locked loop circuit is well-known from the art (see, for example, Transmission Systems for Communications, fourth edition, Bell Telephone Laboratories, Incorporated, 1970, page 619 et seq.). The timing signal generated at the receiver circuit 310 appearing on conductor 313 will be applied to the phase comparator 410, a filter 411, and a voltage controlled oscillator 415. The voltage controlled oscillator will contain a crystal 416 or the like having a specified basic frequency, which in this illustrative embodiment, is selected to be 6.176 megahertz. This is four times the 1.544 megabit bit rate of a T1 transmission line transmitting 193 bits in each 125-microsecond frame.

Figure 4:
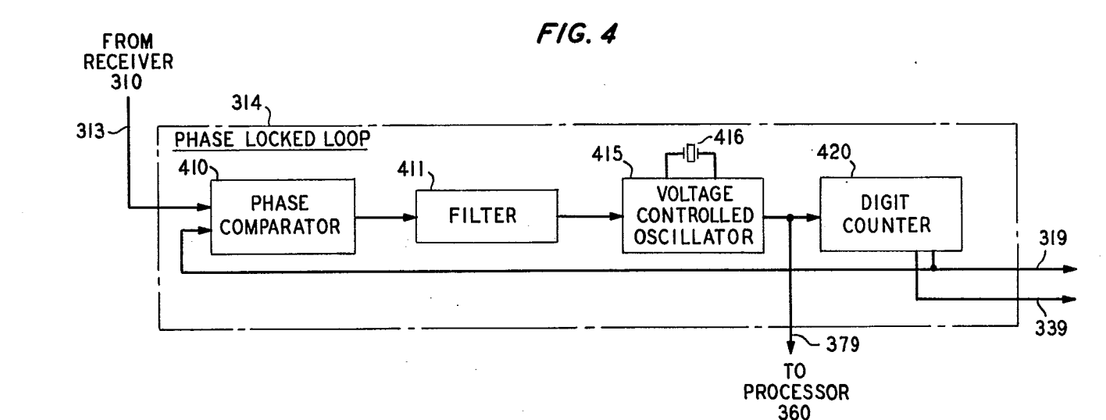
FIG. 4 is a block diagram representation of a known phase locked loop circuit used to derive synchronous clock pulses.

The output signal of the voltage controlled oscillator 415 is applied to a digit counter 420 and to the processor 360, where it serves as the basic clock pulse for the processor as will be discussed later herein. The digit counter 420 may be a commercially available 2-bit counter with a simple encoding circuit adapted to produce an output pulse once for every four input pulses on one output conductor, for example, conductor 319, and to produce on a second conductor, for example, conductor 339, an output pulse once for every four input pulses but delayed from the pulses occurring on the first conductor by one pulse period. The output of the digit counter 420 occurring on the conductor 319 is applied as an input signal to phase comparator 410 together with the timing pulse on conductor 313. The output signal of the phase comparator 410, which is proportional to the phase difference of the two input signals, is used to adjust the voltage controlled oscillator 415 to assure a proper phase relationship between the input timing signal and the clock output signal. The clock output signals appearing on the conductors 319 and 339 will be used in the common circuits 141 as the receive clock pulses and transmit clock pulses, respectively.

Figure 5:
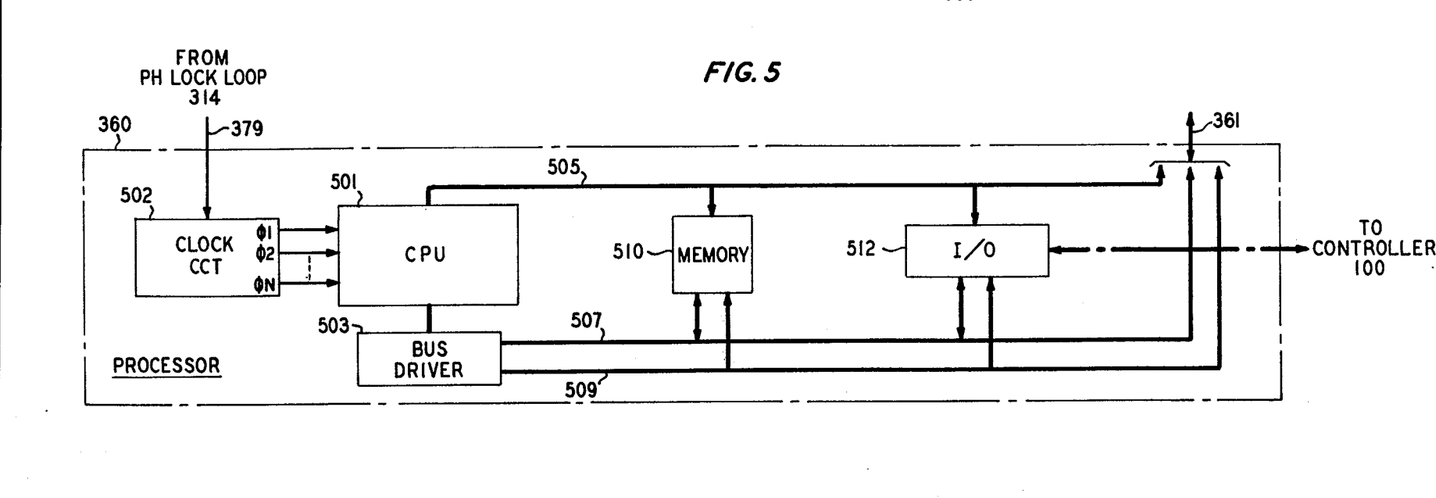
FIG. 5 is a block diagram representation of a known microprocessor which may be used in the system of the invention.

The processor 360 may be a known microcomputer, such as the commercially available INTEL 8080 microcomputer. The processor 360 is shown in block diagram form in FIG. 5. The processor will comprise a central processing unit (CPU) 501, a memory complex 510, and input/output equipment 512 (for example, an input/output terminal). The CPU 501 will include program instruction execution circuits and circuitry for generating address signals to be transmitted on bus 361 via cable 505 and control signals for controlling the bus driver and control circuit 503. The bus driver 503 serves as an interface between the bidirectional data bus 507 and the CPU 501 and further serves to generate read/write control signals for the memory 510, the input/output equipment 512, and other equipment connected to bus 361. The input/output equipment 512 will serve as the interface between the processor 360 and the controller 100. The clock circuit 502 will receive the oscillator output signal on conductor 379, and will supply the appropriate clock signals to the CPU 501 and bus driver and control circuit 503 by means of conductors 508.

The receive clock pulses generated by the phase locked loop circuit 314 on conductor 319 will be used to read data bits from the receive buffer 312 onto the conductor 321 to be transmitted to the decoder circuit 320. The decoder circuit 320 serves to convert each 8-bit data word, representing a speech sample of one communication channel, into a pulse amplitude modulated (PAM) signal. Decoder circuits for performing this function are well-known in the art. In the decoder 320 the proper bits of data are selected from the incoming data stream under control of eight separate enabling pulses generated in the receive digit pulse generator 322 and transmitted via cable 323, which comprises eight separate conductors. The eight enable pulses are used to sequentially activate the decoder 320 to generate one PAM signal from each group of 8-bit PCM word. The PAM signal is transmitted from the decoder 320 to the appropriate one of the channel units 131 via the conductor 325.

The receive channel counter 324, also driven by the clock pulses appearing on the conductor 319, will produce 24 output pulses in each 125-microsecond frame to activate the channel enable memory 326. The channel enable memory 326, which may be a commercially available random access memory, will contain 24 receive channel enable words and 24 transmit channel enable words. One of the receive channel enable words will be read out of the memory 326 and used to enable a specified one of the channel units 131 each time a pulse appears on the conductor 327. This enable signal will be transmitted over the appropriate one of 24 conductors of the cable 329 to cause the specified channel unit to receive the PAM signal occurring on the conductor 325. The channel units 131 will contain well-known circuitry for converting the received PAM signal to an analog speech signal to be transmitted through the switching network 120.

The clock pulses appearing on the conductor 339 will drive the transmit channel counter 344. Like the receive channel counter 324, the transmit channel counter 344 generates 24 output pulses in each frame. These pulses are transmitted to the channel enable memory 326 via conductor 345 and are used to read channel transmit enable words from the memory 326. When a transmit enable word is read from the memory, a corresponding transmit enable signal is applied to the appropriate one of the 24 channel units 131 via the cable 349. Time division gates in the channel units 131 will sample voice signals received from the switching network 120 every 125 microseconds to develop a series of PAM signals. One such PAM signal is transmitted to the encoder 342 via conductor 347 when one of the channel units 131 receives the appropriate enable signal on the cable 349.

A transmit digit pulse generator 340 which is driven from the clock pulses on the conductor 339, will generate eight output signals in sequence on eight separate conductors of the cable 343. In the encoder 342 the eight pulses appearing on the cable 343 are employed to generate eight PCM pulses for each PAM signal appearing on the conductor 347. The PCM pulses are transmitted on the conductor 351 to the transmit buffer 352, which may be a commercially available buffer memory of First-In/First-Out type. This buffer, the write and read operations of which are controlled by the clock pulses on conductor 339, is provided primarily to gain ready access to the outgoing PCM data stream for system test purposes. From the transmit buffer 352, PCM data bits are transferred to outgoing PCM line 151 via the conductor 353 and the driver circuit 354. The driver 354 may be a standard circuit for use with the multiplex line 150 and generally will include circuitry for converting the binary PCM information to bipolar signals.

The processor 360 has access to the receive buffer 312, the transmit buffer 352, the receive digit pulse generator 322 and receive channel counter 324, the transmit digit pulse generator 340 and transmit channel counter 344, and the channel enable memory 326, by means of the bus 361. Such access provides for processor control of the circuits which define the operation of the common circuits 141. Furthermore, the processor 360 is given access to the incoming data stream, primarily for the purpose of extracting signaling information, by means of the signal extraction register 373 via bus 361. Similarly, processor access to the outgoing data stream is provided by means of the output signal register 371 via bus 361, to allow for routine insertion of signaling and framing information. The signal extraction register 373 may comprise a well-known shift register capable of accepting a predetermined number of bits (e.g., 40 bits) from the incoming data stream. Signaling to distant offices is accomplished by inserting signaling bits in the eighth bit position of words of every sixth frame as is customary in known PCM carrier systems. The signaling bits are inserted in the bitstream by means of the output signal register 371, which may comprise a shift register and a timing circuit to gate the information onto conductor 351. The register will be controlled and loaded by the processor 360 on a synchronous basis.

The processor 360 must perform a number of functions in order to control the time-division line interface common circuits 141. Several of these functions are performed synchronously and the program of the processor is arranged to perform the synchronous functions in step with the flow of incoming data and the flow of outgoing data. The functions to be performed by the microprocessor are essentially the same as those performed by known time division interface arrangements as described, for example, in the article entitled "PCM-Concepts, Developments and Potential" published in the GTE Lenkurt Technical Journal of June 22, 1976. These functions include checking for proper framing conditions, taking steps to place the circuitry in synchronism with the incoming frames, receive signaling bits and transmit signaling bits. Additionally, the processor 360 will perform certain maintenance functions including inserting test data in the receive and transmit data streams, by means of the receive buffer 312 and transmit buffer 352, and monitoring the receive and transmit data streams for any particular or specified pattern.

Figure 6A:
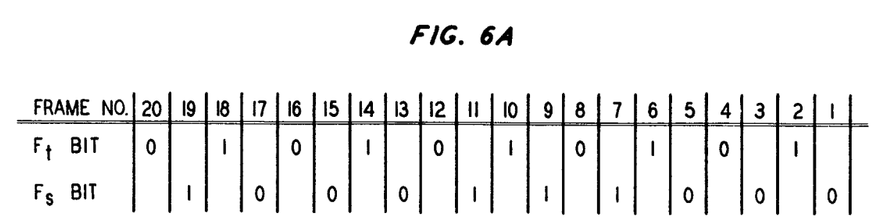
FIGS. 6A and 6B show a known PCM signal information format.
Figure 6B:
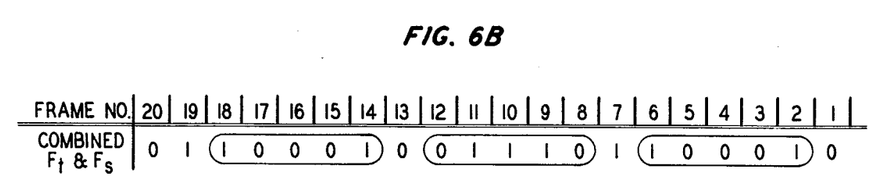

As mentioned earlier herein, the PCM data stream is divided into repetitive bit patterns of 193 bits each, referred to as frames. Each frame represents 24 voice channels and each channel comprises 8 bits of information representing one voice sample. The 193rd bit of each frame contains some information relating to the framing and signaling. The 193rd bit of every other frame will contain information relating strictly to framing and in the other alternate frames the 193rd bit position will contain information relating strictly to signaling. Information bits relating strictly to framing will be referred to herein as Ft bits and information in the 193rd bit position relating to signaling will be referred to herein as Fs bits. In a series of frames, the Ft bits will be alternating ones and zeros and the Fs bits will be a series of three ones followed by a series of three zeros. FIG. 6A shows an arrangement of Ft bits and Fs bits for 20 consecutive frames. FIG. 6B shows the merged Fs and Ft bits as they will appear in a series of 20 consecutive frames. This pattern is clearly repetitive. In prior art systems, the framing bits and signaling bits are typically separated and each is examined independently for the proper pattern. In accordance with applicant's invention, using a synchronously programmed processor, the entire sequential pattern may be processed to determine any irregularities. It is a common problem on time division lines that a faulty line will cause an intermittent loss of information. Accordingly, it is common practice, when monitoring framing bits, to ignore occasional loss of framing pattern and to summon alarm only when several framing bits have been lost. Prior art systems, however, have not had the capability to store a significantly large number of framing bits and to perform an analysis on the framing bits and create a record of intermittent loss of framed conditions. Advantageously, with the synchronously programmed processor such information will be available.

As indicated above, the framing Ft bits have the alternating ones and zeros pattern and the signaling Fs bits have an alternating pattern of three ones followed by three zeros, etc. Since the Fs bits occur only in alternate frames, three Fs bits represent six signaling frames and one series of three ones followed by three zeros represents twelve frames. In this illustrative arrangement and in the well-known D2 and D3 PCM formats, the eighth bit of every sixth frame is a signaling bit. By means of the Fs bits even and odd multiples of six frames may be identified. Two signaling channels are defined, known in the art as "A" and "B" signaling channels. The "A" signaling channel will occur in odd multiples of six frames and the "B" signaling channel will occur in even multiples of six channels.

One function of the processor 360 in accordance with applicant's invention, is to obtain from the signaling extraction register 373 the receive signaling bits for processing and for transmission to the controller 100. Employing a synchronous program, the processor 360 may be programmed to obtain the signaling bit directly from the incoming data stream by reference to the bit pattern received on the 193rd bit. For example, the "A" signaling bits will arrive in frames which are identified as odd multiples of six and "B" signaling bits will be received in frames which are identified as even multiples of six. With reference to FIG. 6A, it may be seen, for example, that the "A" signaling bit will be received in a frame in which the 193rd bit position is a "1" and the sequence of bits in the 193rd bit position of the preceding four frames was as follows: 1001. The "B" signaling bits will be received in the frame in which the 193rd bit is a zero preceded by four frames wherein the bit pattern for the 193rd bit was as follows: 0110. Thus, signaling bits received in the "A" and "B" channels must be separated by the processor 360.

Figure 7:
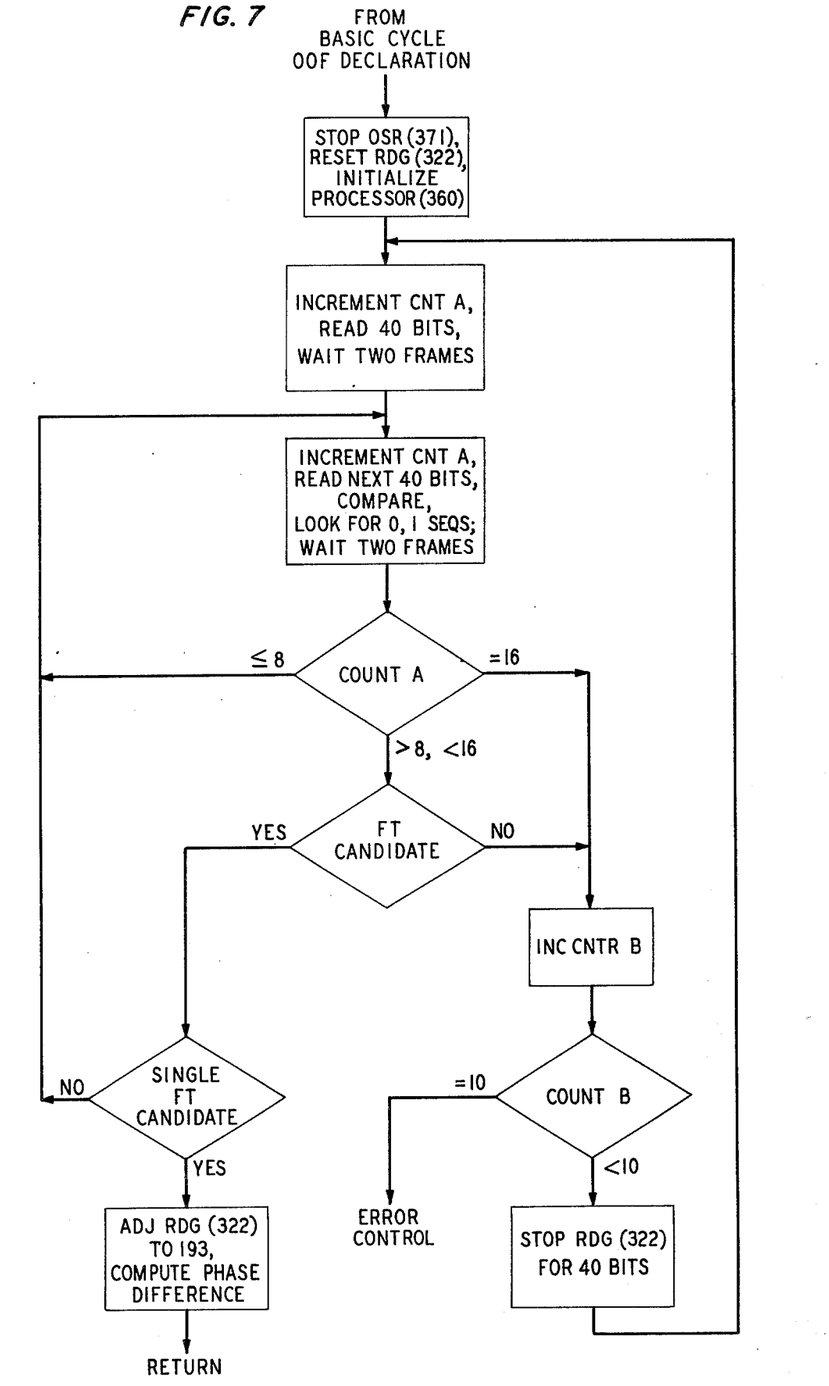
FIG. 7 is a flow diagram of a framing program illustrating a program sequence to be executed by the microprocessor of FIG. 5.

In the event that an out-of-frame (OOF) condition occurs, the processor 360 initiates a framing routine wherein the incoming bitstream is interrogated to find the 193rd bit position. A flow diagram for an illustrative sequence for a framing program is shown in FIG. 7. In the illustrative arrangement, the processor 360 may load the output signal register 371 with a signaling code representing a talking state, and recirculating that code in the output signal register 371 to continue to transmit the talking state signal condition, thereby avoiding cutting off calls which are in the talking state. The transmit digit pulse generator 340 is essentially free-running and not affected by the out-of-frame condition. Nevertheless, it is important for the microprocessor to be synchronized to the transmit side of the interface circuit. Accordingly, during the out-of-frame program the microprocessor is stopped and restarted at the occurrence of a particular bit, for example, the 193rd bit on the transmit side. In this manner, the processor 360 will become synchronized with the transmit side. Thereafter, the processor 360 will read several bits of the incoming bitstream and compare these bits with like-numbered bits arriving exactly two frames later. The number of bits to be selected for the comparison is arbitrary. For example, the processor 360 may accumulate 40 bits of one frame and compare them with the corresponding 40 bits two frames later. As explained earlier, with respect to FIG. 6, the framing signals Ft occur only in every other frame, hence, when looking for Ft bits, the processor 360 will look only at every other frame. Furthermore, as is explained with respect to FIG. 6 the Ft bits comprise a pattern of alternate ones and zeros and it is this pattern that must be detected from the comparison.

Reference is made in FIG. 7 to count "A" and count "B" which represent the contents of conventional counting arrangements which may be implemented by means of counter circuits or by means of memory registers which are incremented under program controls. In the illustrative program, the 40-bit groups will be read from eight separate frames and count "A" is employed to keep track of the number of frames examined. When count "A" is greater than eight, but less than sixteen, a test is made to determine whether a sequence has been found with respect to a certain bit position indicating that the bit represents a series of Ft bits. If such is the case, a further check is made to determine whether there is a single bit which has these proper sequences or whether there are several bits. In case there is more than one candidate, an additional 40 bits will be read to narrow down the selection. When a single candidate has been found, it is assumed that the Ft bit has been found. At that point, the receive digit pulse generator 322 is adjusted to coincide with the framing bit position and the program of the processor 360 branches to the synchronous processing program in synchronism with the receive digit pulse generator 322 and, hence, in synchronism with the incoming bitstream. At this point, a determination must be made by the program to compute the difference between the bit position of the transmit stream, to which the processor 360 was synchronized prior to discovery of the Ft bit, and the bit position of the incoming bitstream.

In the event that a candidate for the Ft bit is not found in the first sixteen frames in the first 40-bit positions, the next 40-bit positions will be examined for at least eight frames to determine whether an Ft candidate exists. The shift to the next 40 bits is accomplished by stopping the receive digit pulse generator 322, for a period equal to 40-bit positions. The count "B" is used to keep track of the number of times that a shift of 40 bits is made. In the illustrative arrangement, ten shifts of 40 bits are made to assure that at least two complete frames are covered in this manner. It will be apparent, that the limiting counts of sixteen and ten for count "A" and count "B," respectively, may be varied as desired. If no Ft candidate is found during the execution of the out-of-frame program sequence, an error-control signal may be transmitted to the controller 100 or the program may be repeated several more times as desired.

Figure 8:
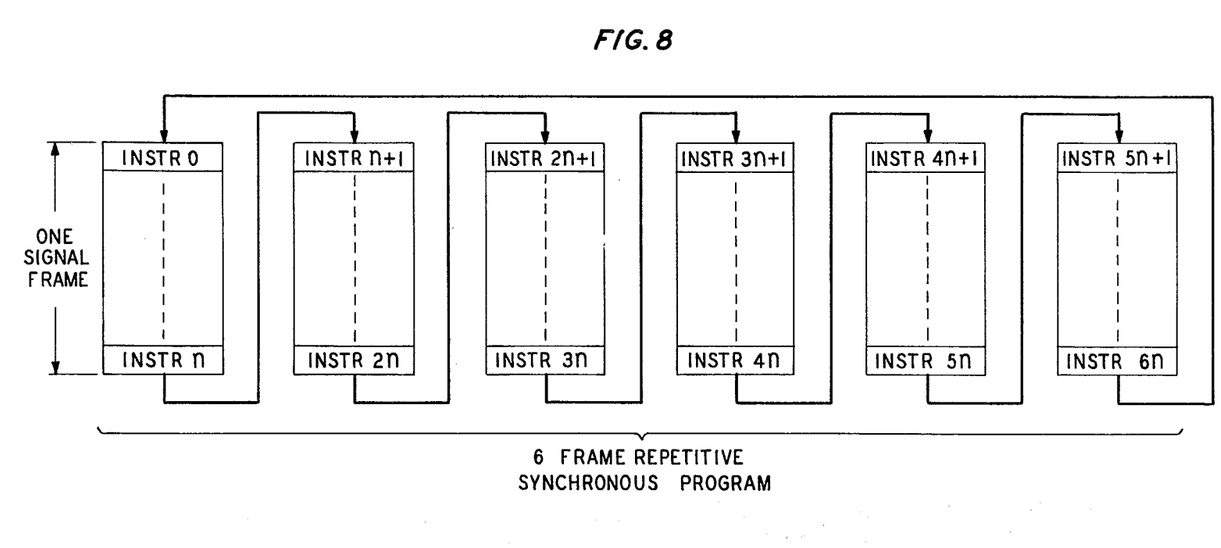
FIG. 8 is a suggested arrangement of a synchronous program for the system of the invention.

A suggested arrangement for a synchronous program for use in the system of the invention in the in-frame mode, is shown in FIG. 8. By its nature, the program is repetitive and FIG. 8 depicts an arrangement which is intended to be repetitive over six cycles. As mentioned earlier herein, signaling information occurs in each 6th PCM frame. To provide a program which is basically repetitive and which will handle signal information at least every 6th frame, the program is divided into six cycles with each cycle having the exact time duration of a single PCM frame. The number of program instructions which may be executed in a single cycle is clearly a function of the operating speed of the processor 360. In the illustrative system herein, each PCM frame is equivalent in time to 386 clock cycle of the processor 360. A selected number of machine instructions may be executed during each such a frame. Depending on the number of clock cycles required for each instruction, certain functions, such as reading and verifying the state of the 193rd bit, may be performed in each frame. Other functions which must be performed periodically, but which need not be performed in every frame, may be performed, for example, in any other frame. The transfer of signal information must be performed every 6th program cycle or at least sometime during the 6th cycle interval, if it is assumed that the signal extraction register 373 is sufficiently large to temporarily store the signaling bits. Other program functions which need not be performed in synchronism with the incoming or outgoing bitstream, for example, certain self-checking routines, may be performed during any unoccupied time period of the six program cycles. As mentioned earlier, the signaling information may be transmitted in 2 channels referred to as "A" channels, "B" channels, each of which has a 12-frame repetition cycle. To accommodate both channels within the six-cycle program, an additional identification bit may be added to the signal information to distinguish the "A" channel from the "B" channel.

Advantageously, in accordance with this information no timed interrupt or other sophisticated arrangements are required for keeping track of elapsed time in between occurrences, such as the arrival of signaling bits. When the proper framing has been established, as described earlier with respect to FIG. 7, the six-cycle program is initiated and thereafter execution of all instructions within the six-cycle program will be in synchronization with the PCM data bits flowing in the common circuits 141. As discussed earlier, the outgoing data stream will be synchronized in time to the ingoing data stream and, hence, the six-cycle program will be executed in synchronization with both data streams.

It is to be understood that the above described arrangement is merely an illustrative application of the principles of the invention and that numerous other arrangements may be devised by those skilled in the art without departing from the spirit and scope of the invention.

What is claimed is:

1. Apparatus, for use with a communication switching system, for receiving and transmitting serial streams of digital data comprising:
    an incoming transmission line;
    means connected to said incoming line and adapted to generate timing pulses representative of the bit rate of an incoming stream of data appearing on said line;
    clock means responsive to said timing pulses for generating clock pulses synchronized to said bit rate;
    a program controlled processor including a stored program comprising sequences of instructions; and
    accessing means interconnecting said incoming transmission line and said processor;
    said program controlled processor including means responsive to said synchronized clock pulses for executing program instructions in synchronism with said bit rate, said processor program including one or more input accessing instructions for causing said processor to access said incoming transmission line via said accessing means and other instructions, one of said accessing instructions being executed each time after execution of a preselected number of said other instructions, whereby said processor accesses said incoming transmission line in synchronism with the bit rate of an incoming bitstream on a periodic basis without timed interrupts.

2. Apparatus in accordance with claim 1, and further comprising:
    an outgoing transmission line;
    additional accessing means interconnecting said outgoing transmission line and said processor; and
    said processor program further including one or more output accessing instructions for causing said processor to access said outgoing transmission line via said additional accessing means, one of said output accessing instructions being executed each time after execution of a predetermined number of said input accessing and said other instructions, whereby said processor accesses both said incoming and said outgoing transmission line in synchronism with the bit rate of an incoming bitstream on a periodic basis without timed interrupts.

3. A communication switching system comprising a receive and a transmit terminal connectable to a pair of time division lines and further comprising:
    a receive circuit connected to said receive terminal for generating output pulses representative of signal pulses received from said receive terminal and timing pulses representative of the signal pulse rate of said signal pulses;
    clock means responsive to said timing pulses for generating a series of clock pulses synchronized to said timing pulses;
    a transmit circuit connected to said transmit terminal;
    a program controlled processor comprising a stored program consisting of a plurality of program instructions, including instructions to transfer data to and from said transmit and receive circuits and other instructions, and responsive to said clock pulses for executing said program instructions in synchronism with said clock pulses; and
    an input/output bus connecting said processor to said receive circuit and said transmit circuit;
    said processor program being arranged such that one of said data transfer instructions is executed after a predetermined number of said other instructions have been executed, to transfer data between said processor and said receive and transmit circuits via said input/output bus in synchronism with said signal pulse rate.

4. In combination with a telecommunication switching system, a PCM line interface circuit comprising:
    a receive circuit connected to an incoming PCM time division line, and a transmit circuit connected to an outgoing PCM time division line;
    said receive circuit responsive to PCM data pulses received from an incoming line to generate digital output signals representative of said data pulses and timing pulses synchronized to the signal pulse rate of said data pulses;
    a clock circuit including a variable frequency oscillator and a phase locked loop circuit, and responsive to said timing pulses for generating clock pulses synchronized to said timing pulses;
    first bitstream access means connected to said receive circuit and second bitstream access means connected to said transmit circuit; and
    a program controlled processor having a stored program comprising a plurality of instructions, program execution circuits, an input/output bus connected to said first and said second bitstream access means, and a gating pulse generating circuit connected to said clock circuit for generating instruction execution and input/output bus transfer signals;

said processor having an instruction execution cycle period less than the periodicity of signaling information pulses occurring periodically in a PCM data stream; and said program including input/output instructions for transferring signaling information from said first bitstream access means to said processor and from said processor to said second bitstream access means via said input/output bus and arranged such that each input/output instruction is executed after execution of a predetermined number of instructions, whereby incoming and outgoing PCM bitstreams are accessed periodically by said program controlled processor without program interrupts.

5. A telecommunications switching system having connected thereto a multiplexed PCM digital trunk adapted to transmit a plurality of data channels and comprising a switching network comprising a plurality of network terminals and an interface circuit interconnecting said network terminals and said PCM trunk, said interface circuit comprising:

a digital transfer circuit connected between said switching network terminals and said multiplexed PCM digital trunk and comprising an input signal demultiplex circuit, an output signal multiplex circuit, a clock circuit, and a processor;

said clock circuit having an input terminal connected to said PCM trunk and an output terminal connected to said demultiplex circuit, said multiplex circuit, and said processor and responsive to incoming PCM data pulses appearing on said trunk for generating, at said clock circuit output terminal, clock pulses in synchronism with the PCM bit rate of an incoming data system;

said processor comprising a stored program and timing circuitry responsive to said clock signals for controlling the execution of said program in synchronism with the bit rate of the incoming bitstream;

said processor being connected to said input signal demultiplex circuit and to said output signal multiplex circuit and said processor stored program being arranged to periodically fetch data from said input signal demultiplex circuit and periodically transfer information to said output signal multiplex circuit in synchronism with the bit rate of the incoming bitstream.

6. The system in accordance with claim 5 wherein said interface circuit further comprises:

a plurality of signal converters corresponding to said plurality of channels connected to said switching network terminals for converting incoming digital signals to analog signals and for converting outgoing analog signals to digital signals; and a memory arrangement connected to said clock output terminal and to said signal converters and containing addresses identifying said signal converters, and wherein said addresses are read from said memory in synchronism with said PCM bit rate to enable said signal converters to receive data representing encoded signals from said digital transfer circuit and to transmit data representing encoded signals to said digital transfer circuits.

7. The system in accordance with claim 6 and further comprising indicator means in each of said converters for indicating the active and standby state of each converter, and wherein said processor is adapted to interrogate the state of said indicator means on a periodic basis and in synchronism with the bit rate of the incoming bitstream.

8. A telecommunication switching system in accordance with claim 5 adapted to receive and transmit data in data frames, each frame comprising all of said plurality of channels, and further adapted to transmit data in frames not coinciding in time with frames of incoming data and wherein said processor comprises means for storing information defining the extent of noncoincidence in time between said receiving and transmitting frames.

9. The system in accordance with claim 8 wherein an incoming data stream includes frame identity bits, and said processor is adapted to read said frame identity bits and to determine frame starting points.

10. A time division switching system comprising a central processor and a microprocessor and further comprising:

a line interface circuit having a transmit circuit and a receive circuit connectable to an output and an input time division transmission line, respectively;

said receive circuit comprising means for deriving output pulses representative of data pulses received from said input transmission line and timing pulses representative of the bit rate of data received from said input transmission line;

clock means responsive to said timing pulses for generating clock pulses in synchronism therewith; and a receive buffer and a transmit buffer connected to said receive and transmit circuits, respectively, said output pulses being transmitted to said receive buffer and entered in said receive buffer under control of said timing pulses and removed from said receive buffer under control of said clock pulses;

said microprocessor comprising clock circuit means responsive to said clock pulses for generating microprocessor execution timing pulses, said microprocessor further comprising a stored program containing instructions for reading data from said receive buffer and transmitting data to said transmit buffer and program execution means responsive to said execution time pulses for executing program instructions, whereby said execution is performed in synchronism with timing pulses derived from the bit rate of data received from said input transmission line, said program being arranged for sequential execution, including the execution of a transfer instruction to transfer data to and from said buffers each time after a preselected number of processor execution cycles.

* * * * *